United States Patent

Rossum et al.

Patent Number: 5,864,876
Date of Patent: Jan. 26, 1999

[54] DMA DEVICE WITH LOCAL PAGE TABLE

[75] Inventors: David P. Rossum, Aptos, Calif.; Khir Hien Tan, Singapore, Singapore

[73] Assignee: Creative Technology Ltd., Singapore, Singapore

[21] Appl. No.: 778,943

[22] Filed: Jan. 6, 1997

[51] Int. Cl.[6] .................................................. G06F 12/00
[52] U.S. Cl. ......................... 711/206; 711/207; 711/208; 395/842; 395/821
[58] Field of Search .................................... 395/842, 821, 395/182.04; 711/206, 207, 208, 3, 141

[56] References Cited

U.S. PATENT DOCUMENTS

| | | | |
|---|---|---|---|
| 4,669,043 | 5/1987 | Kaplinsky | 711/3 |
| 4,774,659 | 9/1988 | Smith et al. | 711/208 |
| 5,524,233 | 6/1996 | Milburn et al. | 711/141 |
| 5,572,660 | 11/1996 | Jones | 395/182.04 |
| 5,671,439 | 9/1997 | Klein et al. | 395/821 |

*Primary Examiner*—Tod R. Swann
*Assistant Examiner*—Mehdi Namazi
*Attorney, Agent, or Firm*—Townsend and Townsend and Crew LLP

[57] ABSTRACT

A DMA device which can quickly access main memory over a system bus without requiring an allocation of a contiguous block of memory on start-up. This is accomplished by providing a copy of the host microprocessor's page table to the DMA device for the portion of memory allocated to it. The DMA device preferably stores at least a portion of the page table internally, with any remainder of the page table being stored in main memory at an address stored in said DMA device.

18 Claims, 4 Drawing Sheets

DMA DEVICE WITH LOCAL PAGE TABLE

BACKGROUND OF THE INVENTION

The present invention relates to direct memory access (DMA) devices, and in particular to sound synthesis drivers.

A DMA device is a device which can access memory without using the CPU in a computer system. This allows a faster data transfer than if the CPU had to be used for transferring every byte of data. In systems using virtual addresses with page translation, the DMA device typically either uses exclusively physical addresses or may use the virtual address with a translation being done by a separate memory controller chip outside of the system CPU.

A computer system will have an operating system which controls communications between the main microprocessor, memory and any peripherals. In the Microsoft Windows '95 operating system, the host processor only allocates contiguous memory as requested upon start-up of the system. Thus, if a peripheral desires a contiguous block of memory, it must request it upon start-up. Otherwise, the host processor will only allocate memory without regard to contiguity. Thus, when a peripheral subsequently requests a block of memory, that block may be distributed over a series of smaller blocks in available spaces in main memory, as set forth in a page table maintained by the host microprocessor.

An internal bus is typically used to connect the microprocessor and main memory to other peripherals. For example, Intel has popularized the PCI bus for this purpose. Among the peripherals that may be attached would be sound boards or 3D graphics boards for providing sound and graphic synthesis and other functions. These devices often need to contain their own on-board memory because of the access speeds required for sound and graphics manipulations.

Some microprocessors include native signal processing capabilities, which enable them to perform certain graphics operations or sound manipulations in the host CPU itself. This has the advantage of allowing the host to directly access the main memory for the required data quickly, and without the cost of an additional board, but with a limitation of adding more complexity to the host microprocessor.

SUMMARY OF THE INVENTION

The present invention provides a DMA device which can quickly access main memory over a system bus without requiring an allocation of a contiguous block of memory on start-up. This is accomplished by providing a subset of the information in the host microprocessor's page table to the DMA device for the portion of memory allocated to it. The DMA device preferably stores at least a portion of the page table internally, with any remainder of the page table being stored in main memory at an address, a pointer to which is stored in the DMA device.

In one embodiment, the DMA device is an interface which acts as a bridge to a PCI device for a sound synthesizer chip. The wave tables for the sound synthesizer chip are stored in main memory at the time they are specified for use by the application, not on system start-up. The information in the page table corresponding to the locations of the wave table are copied to a local page table associated with the bridge chip. Preferably, the bridge chip includes a base register pointing to the local page table in main memory, and for each synthesizer channel a pair of address map registers storing the page translations for a currently used page and an anticipated page to be used.

For a further understanding of the nature and advantages of the invention, reference should be made to the following description taken in conjunction with the accompanying drawings.

DETAILED DESCRIPTION OF THE PREFERRED EMBODIMENTS

Figure 1:
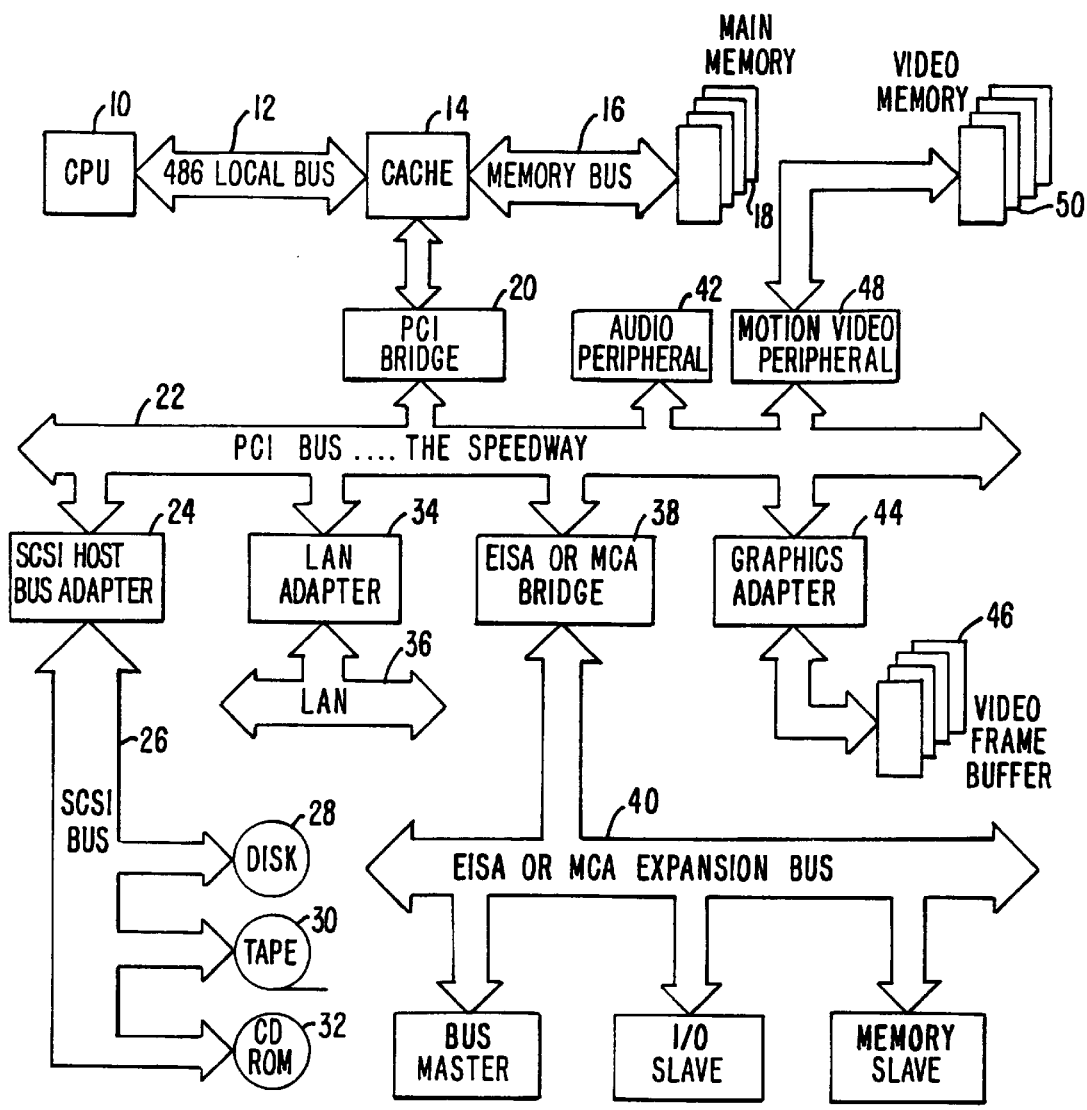
FIG. 1 is a block diagram of a typical computer system illustrating a PCI bus.

FIG. 1 is an illustration of a typical computer system having a host microprocessor or CPU 10 connected by a local bus 12 to a cache memory 14. The cache memory is connected by a memory bus 16 to a main memory 18. Cache 14 may include an on-board memory controller.

A PCI bridge 20 connects to the PCI bus 22. The PCI bus connects to a number of peripherals or other adapters for connecting to other buses. For example, an SCSI host bus adapter 24 connects to an SCSI bus 26, which can be connected to various permanent memory storage devices such as a disc drive 28, a tape drive device 30, or CD-ROM 32. A connection to a local area network can also be provided through a LAN adapter 34 connected to a local area network bus 36. A bridge device 38 may connect to a separate expansion bus 40.

An audio peripheral 42, such as a soundboard, can be connected directly to PCI bus 22. Similarly, a graphics adapter 44 with its own video frame buffer memory 46 can be connected to the PCI bus 22. In addition, a motion video peripheral 48, with its own video memory 50 may be connected to the PCI bus. Note that audio peripheral 42 may be a soundboard including its own, on-board memory for storing wave tables used by the soundboard.

In order to write to or read from main memory 18, a peripheral needs to have its virtual address translated by CPU 10, which slows down the process. Alternately, if the physical address is known, main memory 18 may be accessed directly through a DMA operation. For the physical address of a large block of memory to be known typically requires an allocation of memory upon start-up so that a contiguous block of addresses is provided and the peripheral can know from the starting address where the remaining addresses are actually physically located. If allocation is done subsequently, non-contiguous locations may be used in main memory, requiring explicit translation to determine where each portion of a block of memory is actually located.

The present invention recognizes that for certain peripherals, such as a soundboard, reserving an amount of memory on start-up for all the possible needs of the board would tie up a large amount of memory that may not in fact be needed, or may be needed only a portion of the time. The alternative of having memory allocated as it is needed may slow down the memory access so significantly that it is impractical to use for real time sound generation. Accordingly, the present invention stores a portion of the information in the host microprocessor's page table to allow direct access of wave table data which can be distributed in multiple discontiguous locations or pages throughout the main memory.

Figure 2:
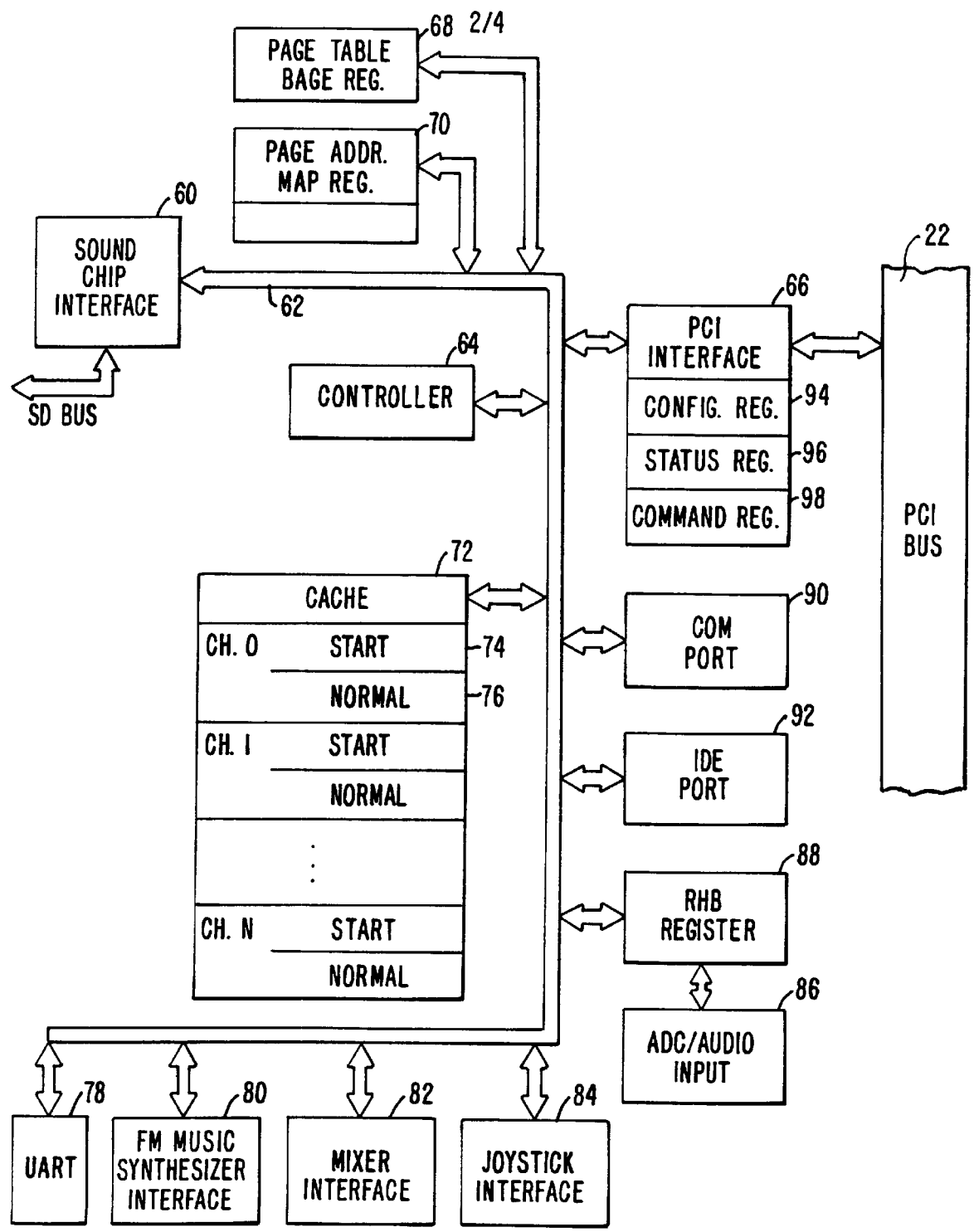
FIG. 2 is a block diagram of a bridge chip according to the present invention.

FIG. 2 is a block diagram of a bridge chip according to the present invention. A sound chip interface 60 is connected to the sound synthesizer chip itself. An internal bus 62 is connected to a controller 64, which may be a microprocessor in one embodiment. The controller interfaces with the PCI bus 22 through a PCI interface 66. A page table base register 68 stores the address in main memory of the local page table entries corresponding to the memory allocated to the sound chip. Additionally, for each synthesizer channel 0–N to registers 70 store the page table translation for a pair of pages, preferably a currently used page and an anticipated page to be used.

A cache memory 72 stores a starting sequence 74 of sound samples and a normal sequence 76 for each of channels 0–N. The start sequence would be the sound information at the start of a repeated loop for a particular channel, with subsequent sound data being the normal block 76. As more and more sound data is brought in from main memory, the normal block 76 is written over, with start block 74 being maintained. Thus, if the sound loops back to the beginning, the starting data is available quickly.

Also shown in FIG. 2 is a UART interface 78, an FM music synthesizer interface 80, a mixer interface 82, a joystick interface 84 and an audio or analog-to-digital converter interface 86. Audio port 86 can be used for direct audio input which can record audio data from the analog-to-digital converter into a small, designated buffer in main memory, the start address and size of which is written at start up into the chip's record host buffer (RHB) register 88. A physical block of memory is allocated upon start-up to this function, and its address and size written to the RHB register. Allocation upon start-up does not present a significant problem since a relatively small area of memory is needed for this function.

The bridge chip of FIG. 2 also provides a COM port 90 and an IDE port 92. In addition, PCI interface 66 includes a configuration register 94, a status register 96 and a command register 98. These registers are used in the standard manner for a PCI bus interface.

Wavetable Register I/O Overview

The bridge chip will act as an interface between the sound synthesizer chip and the PCI bus for the purposes of reading from and writing to sound synthesizer I/O space, as well as reading and writing bridge chip registers.

The bridge chip will cause these registers to appear as the low order 16 bytes within the function 0 I/O space, accessible as bytes, words, and double words according to the register size. The sound synthesizer chip registers will be accessed through the high order 12 bytes of this I/O space according to their normal addresses. The bridge chip registers will be accessed through the low order 4 bytes of the address space using a pointer register which is common to the sound synthesizer chip.

Wavetable Cache Functional Overview

The bridge chip will monitor the sound synthesizer chip Sound Memory interface to identify any read/write sound memory accesses. The interface would typically comprise a sound memory address, a sound memory row address strobe and a sound memory column address strobe. The bridge chip will ignore ROM accesses from the sound synthesizer chip, allowing part of Sound Memory to be implemented in on-board ROM, but will provide data on the SD[15:0] bus when the sound synthesizer chip reads from read/write sound memory. To support these Sound Memory reads, the bridge chip will maintain an on-chip cache 72 for each audio channel, filling the cache with data from host memory and supplying data from the cache to the sound synthesizer chip. The cache is partitioned into a Start Cache, containing the 16 words at the channel loop start address, and a Normal Cache, containing a 16 word window of the current position in the Sound Memory loop, assuming that the current position is not already in the start cache.

By monitoring the sound synthesizer chip's register transactions, the bridge chip will determine the loop START address for each channel from any write to the sound synthesizer chip register containing this information. When a new start is written, the bridge chip will load its start cache for the channel in question from the 16 host sound memory words at and above the start address.

By monitoring the bridge chip's Sound Memory addresses, the sound synthesizer chip will determine if the data falls within the start cache for the channel under service. If it does, the sound synthesizer chip will provide data from the Start Cache, and will insure that the Normal Cache for the channel in question contains the subsequent 16 host Sound Memory words above the start cache. If the sound synthesizer chip's Sound Memory address does not fall in the Start Cache, the Normal Cache will supply data. As the sound synthesizer chip Sound Memory addresses for a given channel increase, the Normal Cache will access increasingly higher data locations from host Sound Memory to insure that the cache remains ready for subsequent sound synthesizer chip accesses.

If the sound synthesizer chip's Sound Memory address falls within neither the Start Cache nor the Normal Cache, (invalid) data from the Normal Cache will be provided, but the Normal Cache will be updated on a priority basis to be consistent with the current address. It can be seen from the above description that the only time an invalid cache address can occur is when a sudden change in a sound synthesizer chip current address occurs which is not equal to the Start address. This should only occur when the current address is reprogrammed at the initiation of a new sound, during which time the audio for the channel should have been silenced.

Wavetable Sound Address Mapping

The sound synthesizer chip Sound Memory address space is mapped into 4 kB pages of host physical memory by the bridge chip allowing the contiguous sound synthesizer chip Sound Memory to be relocated into non-contiguous 4 kB blocks of host memory. The bridge chip indexes into a local page table located in host memory using the higher order page address bits of the sound synthesizer chip Sound Memory address to determine the host memory page address where the sound data is located. The host memory page address is concatenated with the low order bits of the Sound Memory address to form the host physical address where the sound data is located. The bridge chip contains a Page Table Base (PTB) register 68 which is loaded with the starting address of the local page table in host memory. The local page table is relatively small, and allocated at start-up as contiguous physical host memory starting on a 4 kB page boundary, so only the high order 20 bits of the PTB are maintained by the hardware. The lower 12 bits are assumed to be zero. The sound synthesizer chip can generate a 24-bit Sound Memory Address (SMADR) addressing up to 16M samples. In 16-bit sample mode each sample is a 2-byte word, the sound synthesizer chip Sound Memory address space is 32 MB, or 8K pages. Each Page Table Entry is a double-word containing the host physical starting address of a 4 kB block of memory. The local page table can, therefore, be up to 32 kB in size if the full sound synthesizer chip Sound Memory is implemented. The Page Table Base is a full 32-bit address (20 significant high order bits and 12 low order assumed zeros). However, the sound synthesizer chip only maintains 19 bits of translated host page address internally and assumes a zero in address bit 31, limiting Sound Memory to be located in the first 2 GB of host memory. This allows a 32 bit register to be used.

Figure 3:
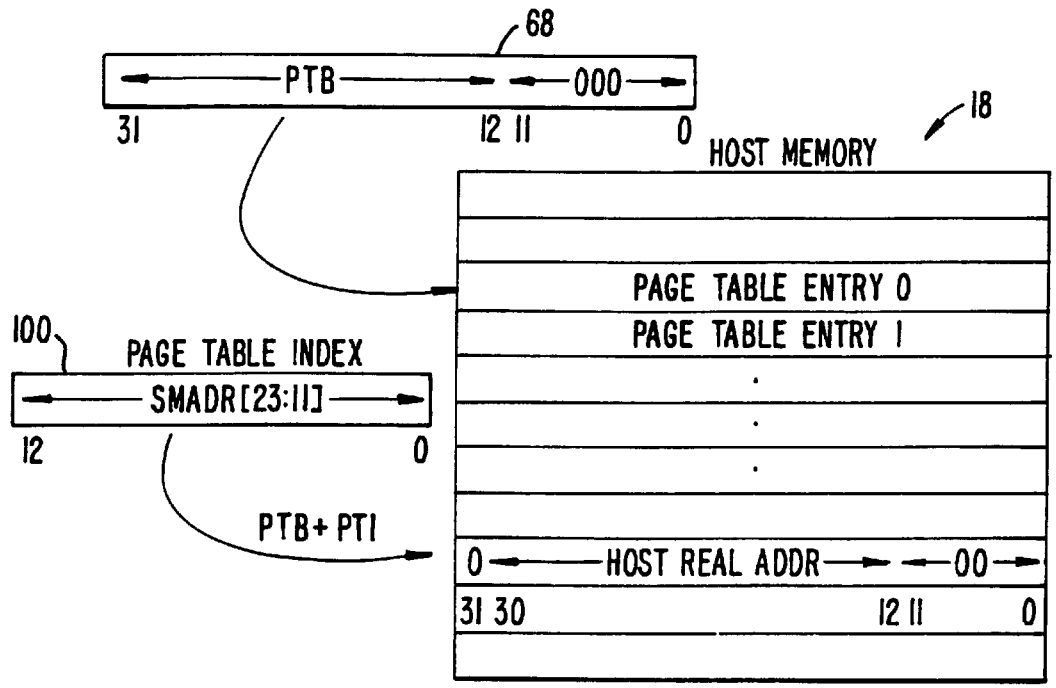
FIG. 3 is a diagram of the page table according to the present invention.

FIG. 3 shows the logical to physical address mapping performed by the bridge chip. The PTB 68 points to the first entry in the local page table in host memory 18. A specific entry is read by adding the sound synthesizer chip Sound Memory address bits 23:11 (the "Page Table Index") from bus 62 to the Page Table Base. Bit 11 is part of the page table index since an assumed zero is appended to SMADR[23:0] to form a byte address, since the samples are 16 bit (two byte) words. The 12-bit address of a byte within a 4 kB page is formed from SMADR[10:0] and the appended 0, leaving SMADR[23:11] to identify the page. The host double-word addressed by the PTB+PTI contains the page address of the sound data in host physical memory.

When the bridge chip reads the page table, it saves the translation in one of two address map registers for the associated synthesizer channel. These 32-bit registers contain the 19 high order bits of the host physical address (assuming the low order 12 bits are zero on a page boundary and the MS bit is zero) and the 13 high order bits of the Sound Memory logical address which mapped to this host physical address. During subsequent accesses to host memory for the sound synthesizer chip sound data, the bridge chip will compare the page portion of the sound synthesizer chip Sound Memory address (SMADR[23:11]) against the logical addresses saved in these two map registers and use the corresponding host physical address from the map register if the current logical address matches the low order 13 bits of the map register. If neither of the map registers matches, then the bridge chip will access the page table in host memory and save the new translation in a map register.

One map register is associated with the start cache, and the other map register is associated with the normal cache. If the access which failed to match is associated with the start cache, the new translation will be put in the map register associated with the start cache. Otherwise, it will be put in the other map register. If neither matches, one would usually overwrite the normal cache. The start cache page translation is only overwritten if the mismatch occurred when associated data is associated with the beginning of the start cache. By this arrangement, even in the unusual case that the start cache itself crosses a page boundary, and a loop is short, the page table accesses are assured to be sparse.

Wavetable ROM Sound Memory

The sound synthesizer chip can still be operated with a sound ROM, in which case the ROM will occupy the lower portion of the sound synthesizer chip Sound Memory address space. The bridge chip will not respond to ROM sound memory accesses, and so no corresponding host sound memory or page table accesses will be made. If a single ROM memory containing 2M samples (4M bytes), for example, is used, the lower 1024 entries (4096 bytes) of the local page table will never be accessed, and hence need not be implemented. Note that in this case, the page table base register must contain an address 4096 bytes below the location of the beginning of meaningful data. The sound synthesizer chip read/write sound memory accesses will all be to pages at or above Sound Memory page 1024. The Page Table Index used by the bridge chip will, therefore, always be 1024 entries (4096 bytes) or greater and must be offset by adjusting the PTB to account for the missing entries.

Wavetable Sound Data Recording

Applications of the sound synthesizer chip/bridge chip chipset will require the capability to store data input through a stereo ADC into host memory. This can be accomplished either by adding an ADC serial input to the bridge chip or by connecting the ADC to the sound synthesizer chip Synchronous Audio input 86 and configuring the sound synthesizer chip channels to store the input samples to sound memory.

Sound memory write operations are treated independently of sound memory reads and do not use the bridge chip cache structure or host page address mapping. Instead a separate Record Host Buffer register (RHB) is provided, containing two fields. The Record Host Address Field holds the 4 kB aligned starting physical address of the data buffer in host memory (RHA) and the Record Host Size Field contains the size of the buffer, from 0 to 7, in 4 kB pages (RHS). A buffer size of 0 inhibits writes to host memory. When the RHA is loaded, the bridge chip will store samples written to sound memory by the sound synthesizer chip into host memory starting at the page address in the RHA with 12 zeroes appended. The bridge chip will increment the host address until it is equal to the RHA+4k*RHS at which point the record address will wrap back to the RHA. Stereo data will be stored by 2 separate sound synthesizer chip channels, however the data will be written to host memory on a first-in, first-out basis using the same Record Host Buffer. The left and right stereo channels will be interleaved in host memory. In order to guarantee the sequence of left and right channels, writes to the RHB register do not take effect in the bridge chip until the beginning of the next sample period. The two sound synthesizer chip channels storing stereo samples will both be providing data from the same stereo frame.

Wavetable Interrupt-On-Loop Operation

The interrupt-on-loop facility allows for ping-pong buffer streaming of audio data. The facility will generate a PCI interrupt when the bridge chip detects that the sound memory address for a channel which is enabled for generating loop interrupts has just entered the Start Cache. The interrupt is enabled by setting a bit corresponding to the channel number in a channel loop register to 1. The bridge chip sets a bit corresponding to the channel number in a channel loop interrupt pending register to 1 when the loop condition is detected for an enabled channel. When one or more bits of the channel loop interrupt pending register are set, the bridge chip will encode the channel number of the highest channel number pending in the Channel Interrupt Pending (CIP) field along with the Global Interrupt Pending (GIP) bit, both of which are in a global interrupt pending register.

The interrupt service software can read the CIP field to determine the highest numbered interrupting channel. When service of the channel is completed, a '1' is written to the GIP bit to clear the current loop interrupt. This clears the IP bit for channel encoded in the CIP field. If no additional loop interrupts are pending, the GIP bit becomes cleared and the CIP field is undefined. If additional interrupts are pending, the GIP bit remains set and CIP contains the channel number of the next pending interrupt. The entire channel interrupt loop pending vector is available in the channel interrupt loop pending register and can alternatively be read and written directly. Writing a one into a bit of the channel interrupt loop pending register resets that bit.

Figure 4:
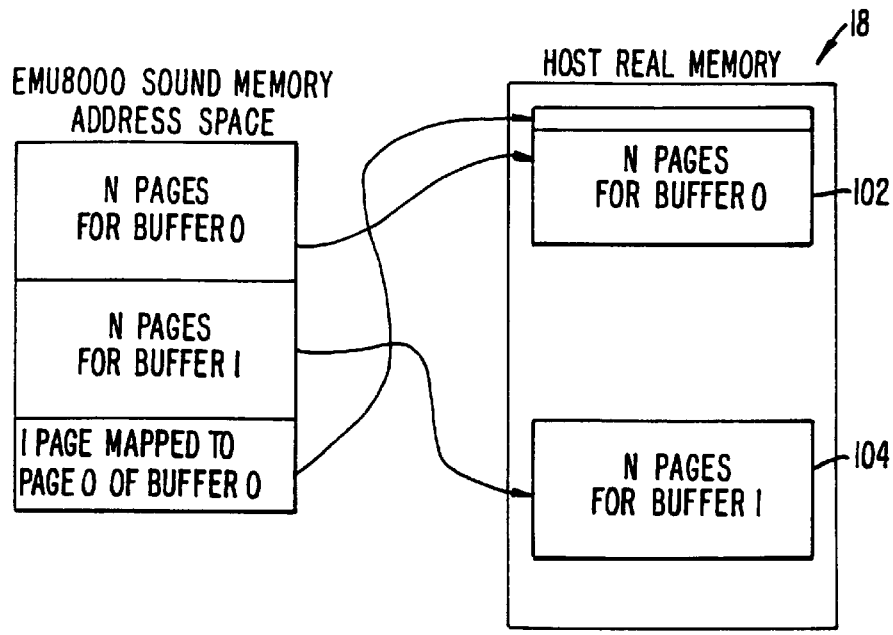
FIG. 4 is a diagram illustrating a double buffering technique in a sound synthesizer chip in accordance with the present invention.

FIG. 4 shows an arrangement of buffers in the sound synthesizer on-chip sound memory and host address spaces which can be used to implement data streaming. Two buffers 102, 104 are allocated in host memory to ping-pong between. Each buffer is some number of aligned 4 kB pages in size. The bridge chip page table is set to map a contiguous block of the sound synthesizer chip sound memory address space to the two ping-pong buffers. In addition, the page in logical sound synthesizer memory space is also mapped to the beginning of the first buffer. This means that the buffer is logically a loop.

On sound initiation, both buffers are filled with audio data, and the sound synthesizer is programmed to play the data. The loop start address and loop last address of the channel playing the data are both set to the beginning of the second buffer, and a loop interrupt is enabled.

When the loop interrupt occurs, the data in the first buffer has been completely used, and hence the first buffer can be re-written. However, the data may not yet be available. So first, the last sample of the second buffer is duplicated eight times and put in the first eight samples of the first buffer (which is also mapped to the four samples after the end of the second buffer). Next, the loop start address is set to the end of the second buffers and the loop last address to four samples beyond the end. In the event the new audio data is not ready by the time the second buffer is exhausted of data, then the sound synthesizer will loop on the constant value of the last sample, thus minimizing the audio discontinuity caused by the lack of data. The number of duplicated samples is the size of a minimum loop (which is typically the maximum upward pitch shift factor, in this case four) plus the size of the interpolation window (in this case four samples).

The new audio data is now awaited. If it was immediately available, the above step can be skipped.

When new audio data is available, it is written to the first buffer. The loop last address is then set to the end of the second buffer, and the loop start to the beginning of the first buffer. A loop interrupt is enabled and awaited.

When this loop interrupt occurs, the same technique of duplicating samples and establishing a loop on constant data is performed at the end of the first buffer. When the data is available, it is transferred to the second buffer, and the loop start and loop end address set to the beginning of the second buffer, thus establishing the original configuration. This algorithm is repeated as long as audio data is to be played.

The extra single page of sound synthesizer address space mapped to the first page of the buffer solves the problem created by interpolation, which is that when the end of the second buffer is reached, the interpolation algorithm accesses samples beyond the end of the buffer to perform the interpolation algorithm. Since these samples are actually coming from the first buffer, the virtual "loop" thus created neatly splices the end of the second buffer with the beginning of the first buffer.

Ensuring Sparse Page Memory Access

One potential problem with using a host memory based local page table is the access time required to obtain the page table entries. A simplest form of the current invention could delete the on-chip address map registers. In this case, each time the sound synthesizer required new data to refill the cache, a local page table access to host memory would need to precede the sound data access in order to determine the physical address. Because of the overhead of PCI host memory read transactions, this would nominally double the bandwidth required for memory reads, since one page table access would be required for each sound memory access. This would only be acceptable when an excess of bandwidth was known to be available.

Figure 5:
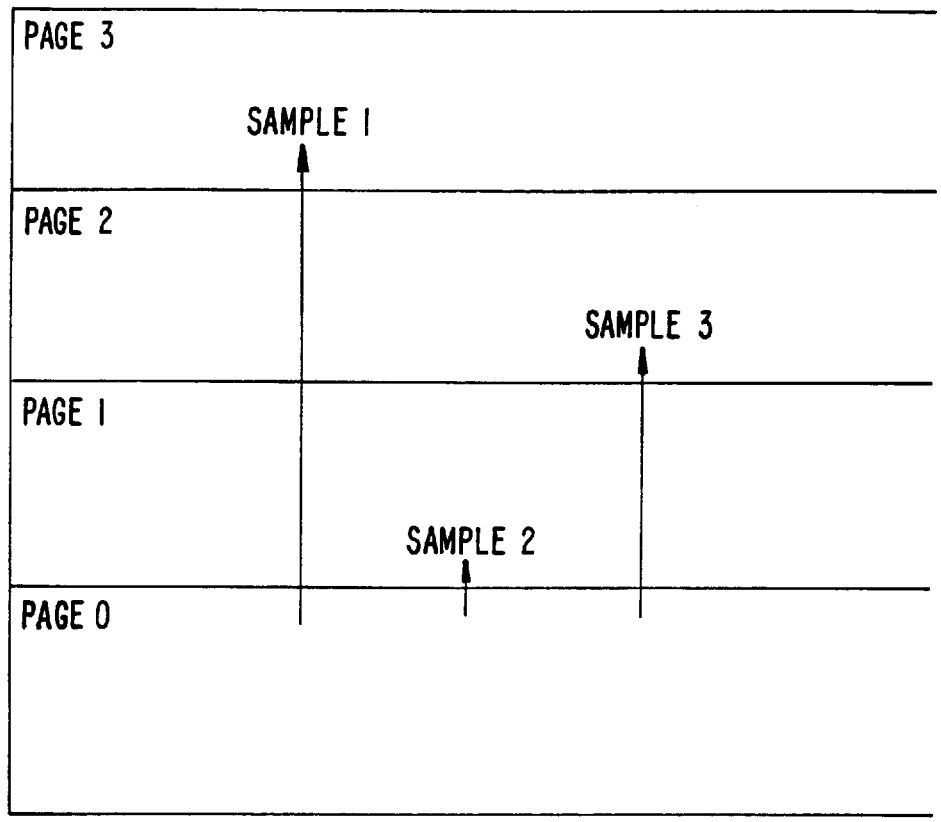
FIG. 5 is a diagram illustrating how sound samples can extend across pages.

It would seem that a single on-chip address map register per channel would substantially improve this situation, but under worst case circumstances, as exemplified in FIG. 5, case "sample 2", this is not the case. In sound synthesis, the location of a sound within sound memory is arbitrary, as is the size of the loop (down to a minimum, in this case, of four samples). Thus under the worst case, a sound with a loop size of four samples could have its loop data crossing a page boundary. In this case, each cache access to obtain data would be from a different page. So once again, even with each channel devoting one address map register to remember the most recently fetched local page table entry, the worst case is one page table access for each sound memory access. Since the system must be designed to preclude data transfer overload under worst case conditions, the addition of a single address map register per channel does not alleviate the problem.

However, the use of two on-chip address map registers per channel provides greatly improved performance. In this case, under the worst case scenario of FIG. 5, case "sample 2' outlined above, one of the address map registers holds the page table entry for the lower page in the looping sound, and the other holds that of the higher page. Thus, no host memory local page table access is required. In fact, repeating host memory local page table accesses are required only when a sound loop spans at least three memory pages, as in FIG. 5, case "sample 3". In this case, a minimum of two host memory page table accesses are required per loop repetition. However, since a page contains 2048 samples, and a typical cache access acquires only 8 samples, it can easily be seen that only two out of 1024 accesses require page table access, or a bandwidth overhead of 0.2% under worst case conditions.

The selection of which of the two address map registers should receive data from a fetch of a new page table entry from host memory requires some further explanation. In the case of the preferred embodiment, there is a simple, effective mechanism. If the sample being fetched is associated with the start cache, the first address map register (called the start map register) is used. Otherwise, the second address map register is used (called the normal map register). In this case, it is easily seen that for the sound depicted in FIG. 5, case "sample 3," the start map register would continue to hold the address of page 0, and the normal map register would be filled with the address of page 1 shortly after the loop occurred, and be filled 2048 sample periods later with the address of page 2, thus achieving the optimal two host memory local page table accesses per loop. In the case of FIG. 5, sample 1, the normal map register would be filled a third time with the address of page 3 near the end of the loop. Thus it can be seen that the overhead in this case is three page table accesses for 2048 cache accesses, or 0.15%. The limit as the loop size increases is easily seen to be 0.1%.

However, the current invention is not limited in utility to designs which employ a separate start cache and normal cache. If instead the caching mechanism uses a single integrated cache, the benefit from two map registers can still be achieved. The selection of which map register to fill could in this case be made based on the LS bit of the logical page number, that is for even logical pages, map register 0 would be used and for odd logical pages, map register 1 would be used. It is clear in this case that for FIG. 5, case "sample 2," map register 0 would be filled with the address of page 0, and map register 1 would be filled with the address of page 1, thus achieving zero repeating host local page table accesses. For the case of sample 3 in FIG. 5, map register 1 would maintain the address of page 1, while map register 0 would be filled by the optimum 2 page table accesses per loop acquiring the address of page 0 and page 2 alternately. However, in the case of sample 1 of FIG. 5, it can be seen that four page table accesses, rather than the optimal three, are required in this scheme. Map register 0 will alternate between page 0 and page 2, and map register 1 will alternate between page 1 and page 3. Thus the efficiency in this case is four page table accesses per 2048 cache accesses, or 0.2%, which becomes the limit for large loops using this scheme.

The improved efficiency providing a limit of 0.1% for large loops can be achieved in unified cache memory systems by choosing to fill map register 0 if the page is below the current contents of map register 0, otherwise filling map register 1. However, since the bandwidth improvement is only of magnitude 0.1%, this scheme is probably not worth the added complexity.

As will be understood by those with skill in the art, the present invention may be embodied in other specific forms without departing from the spirit or essential characteristics thereof. For example, a graphics processor rather than a sound processor could be accessing the data, the bridge controller could be integrated on the same chip or a separate chip from the peripheral, and a larger or smaller number of page translations could be stored in on-chip registers. The address map registers could be any type of local memory, such as a translation look-aside buffer (TLB). Accordingly, the above description is meant to be illustrative, but not limiting, of the scope of the invention which is set forth in the following claims.

What is claimed is:

1. A DMA device configured to process multiple channels of data specified by virtual addresses and adapted for attachment to a bus coupled to a central microprocessor and a main memory, said device comprising:
   a local memory for storing page translations for page addresses in a plurality of address map registers, with at least one address map register associated with each of said channels, for enabling direct retrieval of physical addresses of said main memory corresponding to virtual addresses; and
   a controller for generating physical addresses in said main memory.

2. The device of claim 1 wherein said local memory comprises a translation look-aside buffer.

3. The device of claim 1 wherein said local memory further comprises:
   a base register storing a pointer to a local page table in said main memory.

4. The device of claim 3 wherein said device includes two address map registers for each of said channels for storing the page translations for a currently used page and an anticipated page to be used.

5. The device of claim 1 further comprising a cache memory for storing a portion of a group of data from said main memory.

6. The device of claim 5 wherein said cache memory is divided into a plurality of channels, each channel having a dedicated block of locations within said cache memory, said controller being configured to store data associated with a channel in its corresponding block.

7. The device of claim 6 wherein each of said blocks of locations is divided into a start sub-block of locations and a normal sub-block of locations, said controller being further configured to store an initial group of data in said start sub-block of locations, with subsequent groups being stored in said normal sub-block of locations.

8. The device of claim 1 wherein said bus is a PCI bus.

9. The device of said claim 1 wherein said device is a sound manipulation device and said main memory contains a wavetable at said physical addresses.

10. A sound synthesizer DMA device configured to process multiple channels of data specified by virtual addresses and adapted for attachment to a bus coupled to a central microprocessor and a main memory, said device comprising:
    a local memory for storing information enabling direct retrieval of physical addresses of said main memory corresponding to virtual addresses, said local memory including two distinct locations for each of said channels; and
    a controller for generating physical addresses in said main memory.

11. A sound manipulation device using virtual addresses and adapted for attachment to a bus coupled to a central microprocessor and a main memory, said device comprising:
    a cache memory for storing a portion of a group of digitized sound representations from said main memory;
    a controller for generating physical addresses in said main memory;
    a translation look aside buffer including
        a base register storing a pointer to a page table in said main memory, and
        at least two address map registers for each channel of a plurality of channels storing a page translation for a page address; and
    wherein said cache memory is divided into a plurality of channels, each channel having a block of locations within said cache memory, said controller being configured to store data associated with a channel in a corresponding block.

12. The device of claim 11 wherein each of said blocks of locations is divided into a start sub-block of locations and a normal sub-block of locations, said controller being further configured to store an initial group of sound representations for a channel in said start sub-block of locations, with subsequent groups being stored in said normal sub-block of locations.

13. The device of claim 11 wherein said bus is a PCI bus and further comprising a PCI bus interface including a plurality of PCI interface registers.

14. The device of claim 11 further comprising means for requesting more main memory space from said central processor as needed by said device, and relinquishing main memory space no longer needed by said device.

15. In a DMA device using virtual addresses and adapted for attachment to a bus coupled to a central microprocessor and a main memory, a method comprising the steps of:
    transmitting a request over said bus to said central processor to allocate a portion of said main memory as needed;
    receiving an allocation of addresses in said main memory, including both at least one virtual address and a corresponding physical address; and storing, in a location directly accessible by said device, a table including said virtual address and corresponding physical address for each channel of a plurality of channels.

16. The method of claim 15 further comprising the steps of:

subsequently receiving a virtual address;

translating said virtual address into a physical address using said table; and retrieving data from said physical address in said main memory.

17. The method of claim 15 wherein said device is a sound manipulation device, and further comprising the step of storing a wavetable at said physical address in said main memory.

18. A DMA device using virtual addresses and adapted for attachment to a bus coupled to a central microprocessor and a main memory, comprising:

means for transmitting a request over said bus to said central processor to allocate a portion of said main memory as needed;

means for receiving an allocation of addresses in said main memory, including both at least one virtual address and a corresponding physical address; and means for storing, in a location directly accessible by said device, a table including said virtual address and corresponding physical address for each channel of a plurality of channels.

* * * * *